US008521180B2

(12) United States Patent
Parish

(10) Patent No.: US 8,521,180 B2
(45) Date of Patent: Aug. 27, 2013

(54) LOCATION-BASED AUTOMATED CHECK-IN TO A SOCIAL NETWORK RECOGNIZED LOCATION USING A TOKEN

(75) Inventor: Adam S. Parish, Windermere, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/209,060

(22) Filed: Aug. 12, 2011

(65) Prior Publication Data

US 2013/0040654 A1 Feb. 14, 2013

(51) Int. Cl.
*H04L 29/06* (2006.01)
(52) U.S. Cl.
USPC .................................. 455/456.1; 455/414.3
(58) Field of Classification Search
USPC ............. 709/229, 227, 206; 705/5; 455/456, 455/457, 414.3
See application file for complete search history.

(56) References Cited

U.S. PATENT DOCUMENTS

2006/0047825 A1* 3/2006 Steenstra et al. ............... 709/229
2010/0114614 A1* 5/2010 Sharpe .............................. 705/5
2011/0270751 A1* 11/2011 Csinger et al. .................. 705/42

OTHER PUBLICATIONS

Barnett, Emma; "New App Automates Foursquare 'Check-Ins'", The Telegraph, Aug. 3, 2010, as published at http://www.telegraph.co.uk/technology/news/7924803/New-app-automates-foursquare-check-ins.html.
Lapenna, Joe; "Check in With Google Latitude," Google Mobile Blog, Feb. 1, 2011, as published at http://www.googlemobile.blogspot.com/2011/02/check-in-with-google-latitude.html.

* cited by examiner

*Primary Examiner* — Nizar Sivji
(74) *Attorney, Agent, or Firm* — Pillsbury Winthrop Shaw Pittman LLP

(57) ABSTRACT

A user with a user account on a social network uses an interface to communicate user identification information and the user's intent to participate in a social network application. The user also communicates an identifier associated with an entitlement token to the social network application. When a server receives, from a device at a fixed location, a message indicative of the user's presence at the fixed location as determined by the receipt of the identifier and a site specific identifier, the server generates and sends a communication sufficient to cause the social network to implement a behavior as if the user had generated a message to the social network from their mobile device.

15 Claims, 7 Drawing Sheets

| UNIQUE TOKEN IDENTIFIER 352 | SITE IDENTIFIER 354 |
|---|---|
| 7775352545899XXXX | 99000015111111 |
| 7776452555585XXXX | 990000151111112 |
| 7779352575777XXXX | 990000151111117 |
| 7777252545888XXXX | 990000151111115 |
| 7771152566688XXXX | 99000015111111 |
| 7772352545666XXXX | 990000151111113 |
| 7774452545444XXXX | 990000151111114 |
| 7779225458811XXXX | 990000151111119 |
| 7773352545333XXXX | 990000151111112 |
| 7775552545111XXXX | 990000151111115 |

*FIG. 3*

LOCATION-BASED AUTOMATED CHECK-IN TO A SOCIAL NETWORK RECOGNIZED LOCATION USING A TOKEN

BACKGROUND

A location-based service is an information or entertainment service, accessible with mobile devices through a mobile network. Such a location-based service generally uses the geographical location of the mobile device. The first location-based services were introduced in Europe and included services to locate friends, advertisers, and a caller seeking emergency services. Recent advancements in global positioning systems (GPS), mobile-network operator, and GPS independent techniques have led to a plethora of location-based services including those that provide recommended social events, show the present location of people of interest on a map, turn-by-turn directions to a given address or the nearest business or service. Some other location-based services provide alerts, advertising, or seek real-time feedback from the owner of the mobile device concerning traffic, restaurants, services or other venues registered or otherwise known to the location-based service.

A category of social media tools enable people to use GPS-enabled mobile devices to "check-in" at different locations. Some of these social media tools incorporate a game aspect or offer other enticements to encourage their use. The user of the mobile device uses a browser to visit a website that provides the social media location-based service. The user can "check-in" when they visit a venue as confirmed by the geographical information provided by a mobile device embedded GPS circuit or other provider techniques. The typical check-in process requires the user to open an application on their mobile device, search for the location or venue to determine if it has been registered or is otherwise known to the location-based service, and actively request to "check-in" to the location.

For some location-based social media tools, if the location of the user's mobile device cannot be determined as being within a pre-determined range of the venue, the user is prevented from checking in at the venue. This can occur when the mobile device is indoors or the embedded GPS circuit/service is presently disabled on the mobile device. When the location of the mobile device cannot be confirmed, the user must move to a location with better reception, and/or enable the GPS circuit and wait for confirmation of the device's present location, or for the mobile service provider to otherwise confirm that the phone is within the accepted range for the user to be considered to be at the venue.

However interested the user is in completing a "check-in" operation when they visit a particular venue, some users are unable to because of the absence of location information. Other user may simply forget that they have to actively use their mobile device while near the venue to "check-in." In still other cases, users are just too busy to take the time to reach into their pocket to complete the required steps to initiate a "check-in" request with the social media web site. In addition to these problems with the check-in process, use of these social media tools has become so popular and in some cases so competitive that some users are starting to complain of "check-in" fatigue.

At least one social media tool, Google Latitude®, enables its users to automatically "check-in" at user specified locations when a mobile device running Google® Maps and Google Latitude® is confirmed to be in close proximity to the specified location. Google® and Google Latitude® are registered trademarks of Google, Inc. of Mountain View, Calif., U.S.A. For iPhone® users that have downloaded and installed the next generation operating system, which enables applications to run in a background mode, there is an application available that allows users to automatically "check-in" to their favorite locations when they are in close proximity to them. iPhone® is a registered trademark of Apple, Inc. of Cupertino, Calif., U.S.A. The Google Latitude® auto check-in service has also been adapted to work with mobile devices enabled by the open source operating system, middleware and applications commonly known as "Android." These attempts to automate the "check-in" process are dependent upon specific combinations of mobile device hardware, operating system, and/or mobile application software. It is often the case that a user of a social network interested in an automated solution to the check-in process does not have a combination of hardware, operating system, and/or mobile application software that is capable of accomplishing an automated check-in.

SUMMARY

Embodiments for automatic check-in to a social network recognized location include a method for enabling participation in a social network including the steps of receiving user identification information and a user indication of intent to participate in a social network application and receiving, from a device at a fixed location, a first message including an identifier associated with the fixed location and formatted for a location-based service interface associated with a social network, the first message sufficient to cause the social network to implement at least one behavior.

An alternative embodiment of a method for enabling participation in a location-based social network application includes the steps of receiving, on a social network application interface, a user initiated communication including an identifier associated with an entitlement token, linking a user account on the social network to the identifier associated with the entitlement token, receiving, from a fixed location, an indication that the entitlement token was presented and generating, in response to the indication that the entitlement token was presented at the fixed location, a communication sufficient to cause the social network to modify user information on the social network indicative of the user's presence at the fixed location.

An embodiment of a system for monitoring and presenting human activity is implemented in a server coupled to a network. The server includes a user interface and a processing interface. The user interface prompts a user of the social network to communicate an identifier associated with an entitlement token. The server links the identifier with user account information on the social network. The processing interface receives from a fixed location the identifier associated with the entitlement token and in response forwards a message that directs the social network to update a user status on the social network.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The systems and methods for location-based automated check-in to a social network recognized location using a token can be better understood with reference to the following figures. The components within the figures are not necessarily to scale, emphasis instead being placed upon clearly illustrating the principles for automating the check-in process at social network recognized locations. Moreover, in the figures, like reference numerals designate corresponding parts throughout the different views.

FIG. 3 is a schematic diagram illustrating an embodiment of a table that is periodically analyzed by the mobile application server of FIG. 1 to identify the presence of the entitlement holder at a fixed location.

DETAILED DESCRIPTION

An entitlement token is a visible or tangible representation of one's right or authority to some benefit. A printed ticket, coupon, gift card, resort benefit card, etc. are all examples of items or entitlement tokens that people use to gain access to a venue, to enter a service queue, or to purchase goods or services. Entitlement tokens include unique information that is used when the tokens are presented at a fixed location. Often, information on an entitlement token is scanned, entered, or otherwise added to a computer-enabled system. Tickets and coupons are optically scanned for verification of authenticity, correctness of the date of use with either a date certain or a range of dates, amounts, and perhaps other information. Gift cards, resort benefit cards, debit cards, and other cash equivalents are integrated with magnetic strips that are encoded with personal identification numbers, amounts, limits, room numbers or access codes, as well as user specific and account specific information. In addition to tokens that can be read or scanned magnetically and optically, entitlement tokens can be read and authenticated using near field communication (NFC) techniques. NFC complements other wireless radio-frequency based communication protocols by enabling a user to use a single device across multiple systems. NFC enables devices to share information at a distance of less than 4 centimeters.

Systems and methods for enabling a holder of a location-based social network account to automatically check-in at a social network recognized location take advantage of the presentment, by the account holder, of an entitlement token at the recognized location. In a registration or authorization step, the holder of the location-based social network account uses an interface to enter a unique identifier associated with an entitlement token. The social network associates or links the user account to the unique identifier from the entitlement token. A periodic analysis of presented entitlement token information reveals when the user of the location-based social network account has presented the associated entitlement token at the fixed location. In response to an indication that the unique identifier from the entitlement token was presented at the fixed location, the location-based social network responds by reacting as if the user of the location-based social network account had generated a check-in request from their mobile device while proximally located to the fixed location.

Figure 1:
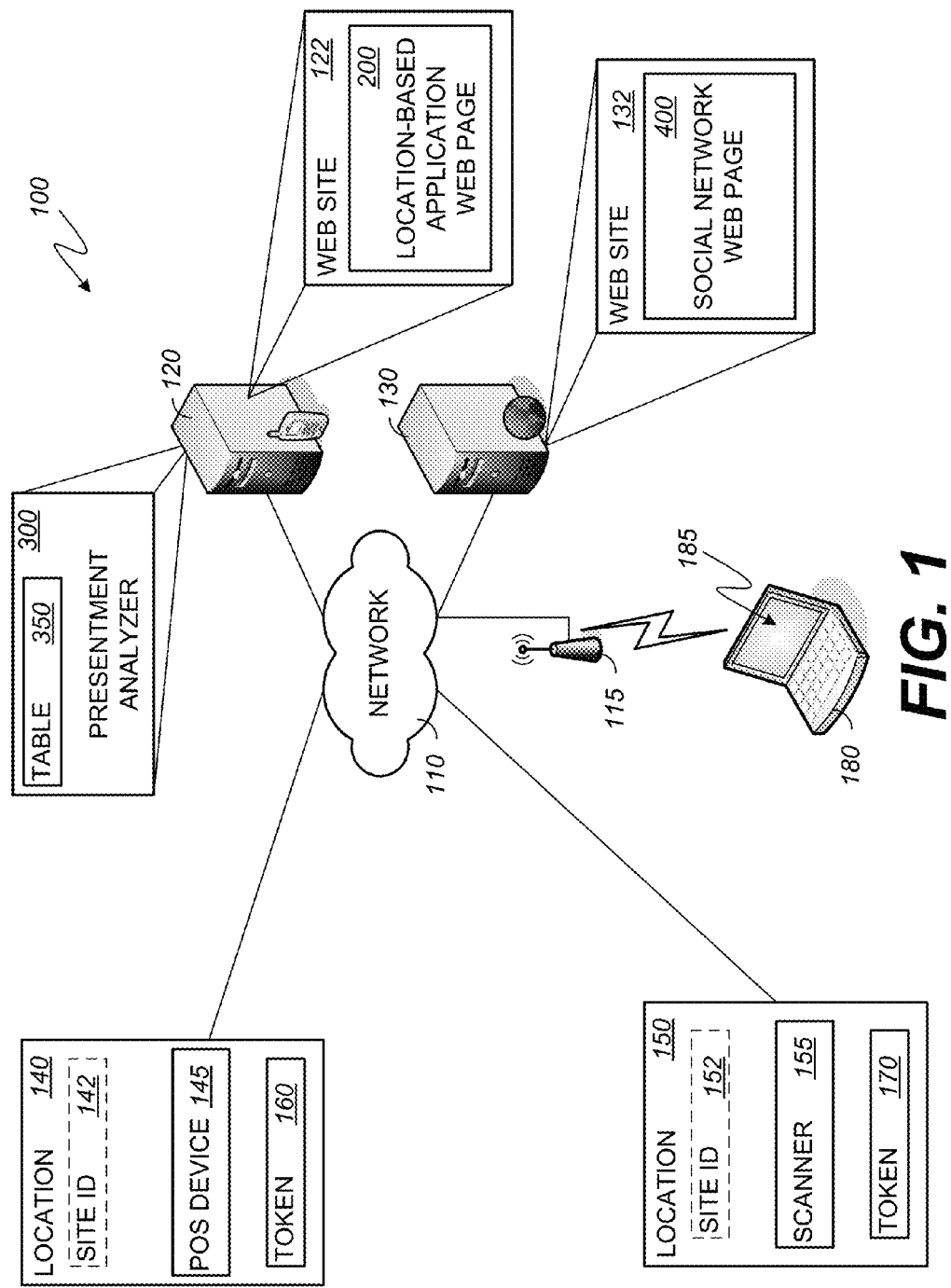
FIG. 1 is a block diagram illustrating an embodiment of a system for monitoring and presenting human activity through presentment of an entitlement token at a fixed location.

FIG. 1 is a block diagram illustrating an embodiment of a system 100 for monitoring and presenting human activity through presentment of an entitlement token. The system 100 comprises a mobile application server 120 and a social network server 130, which are coupled to one another via network 110. The network 110 can include any number of wired and/or wireless communication links via any suitable protocols. The network 110 includes, for example, the Internet, the Public Switched Telephone Network (PSTN), cellular or mobile network(s), local area network(s), wide area network (s), or any other suitable communication infrastructure. In addition to the servers, the system 100 includes a personal computing device, such as the laptop 180, which is coupled to the network 110 via a wireless communications medium and wireless access point 115. In preferred embodiments, users communicate via web browsers, such as the web browser 185 enabled on the laptop computer 180, with web sites enabled by the mobile application server 120 and the social network server 130.

The mobile application server 120 is a computing device or a cluster of computing devices that is configured to provide one or more services to other devices coupled to the network 110. The mobile application server 120 runs or executes software to enable web site 122 and location-based application page 200. The mobile application server 120 also executes a presentment analyzer 300, which monitors a table 350 and communicates certain matches in the table 350 with the web site 122. The location-based application page 200 will be described in association with the schematic diagram illustrated in FIG. 2. The presentment analyzer 300 will be described in association the table 350 illustrated in FIG. 3. Those skilled in the art should appreciate and understand that the location-based service and the social network can be implemented on the same computing device, if so desired. It should also be appreciated and understood that the presentment analyzer 300 can be implemented on a separate computing device coupled to the mobile application server 120 via the network 110.

The social network server 130 is a computing device or a cluster of computing devices that is configured to provide one or more services to other devices coupled to the network 110. The social network server 130 runs or executes software to enable web site 132 and social network web page 400. The social network web page 400 will be described in association with the schematic diagram illustrated in FIG. 4.

In addition to the computing devices, namely, the mobile application server 120, the social network server 130 and the laptop 180, the system 100 includes point-of-sale (POS) device 145, at fixed location 140, and scanner 155, at fixed location 150. The POS device 145 and the scanner 155 are coupled to the network 110 via one or more respective wireless or wired networks. The POS device 145 includes a magnetic strip reader, a radio-frequency identifier tag interrogator or reader, or an optical reader such as an image scanner or camera. In whatever form factor, the POS device 145 is used to obtain information from an entitlement token 160 at the fixed location 140. Information obtained from the entitlement token 160 includes one or more unique information items that can be used to identify the user and/or the entitlement token 160. These one or more unique information items together with a unique site identifier 142 are communicated via the network 110 or a proprietary network connection (not shown) to the mobile application server 120.

Fixed location 140 can be a retail store, café, hotel, airport terminal, library, or other location known to a location-based service. The fixed location 140 is associated with or identified by site identifier 142. The site identifier 142 is any sequence of alphanumeric and/or numeric characters that specifically identifies the retail store, café, hotel, airport terminal, library, or other location to a location-based service enabled by software executed on the mobile application server 120. Entitlement token 160, held by a user of an account with the location-based service, is presented to an agent of the retail store, café, hotel, airport terminal, library, or other venue to purchase goods or services. Alternatively, if the user is purchasing goods or service from a self-service kiosk or self-service check-out line at the venue, the user presents the entitlement token 160 to POS device 145, which reads or scans the entitlement token 160 to authorize a transaction.

Similarly, the scanner 155 includes a magnetic strip reader, a radio-frequency identifier tag interrogator or reader, or an optical reader such as an image scanner or camera. In whatever form factor, the scanner 155 is used to obtain information from an entitlement token 170 at the fixed location 150. Information obtained from the entitlement token 170 includes one or more unique information items that can be used to identify the user and/or the entitlement token 170. These one or more unique information items together with a unique site identifier 152 are communicated via the network 110 or a proprietary network connection (not shown) to the mobile application server 120.

Fixed location 150 can be an entry gate into a national park, an amusement park, an entry point into a queue for a specific service or attraction at the amusement park, a kiosk at a theatre or other location known to, or recognized by, a location-based service enabled by software executed on the mobile application server 120. The fixed location 150 is associated with or identified by site identifier 152. The site identifier 152 is any sequence of alphanumeric and/or numeric only characters that specifically identifies the national park, amusement park, service or attraction at the amusement park, theatre, or other location. Entitlement token 170, held by a user of an account with the location-based service, is presented to an agent of the park or attraction to be scanned by a device, or alternatively presented by the user to a device to access the park, attraction queue, or theatre.

Figure 2:
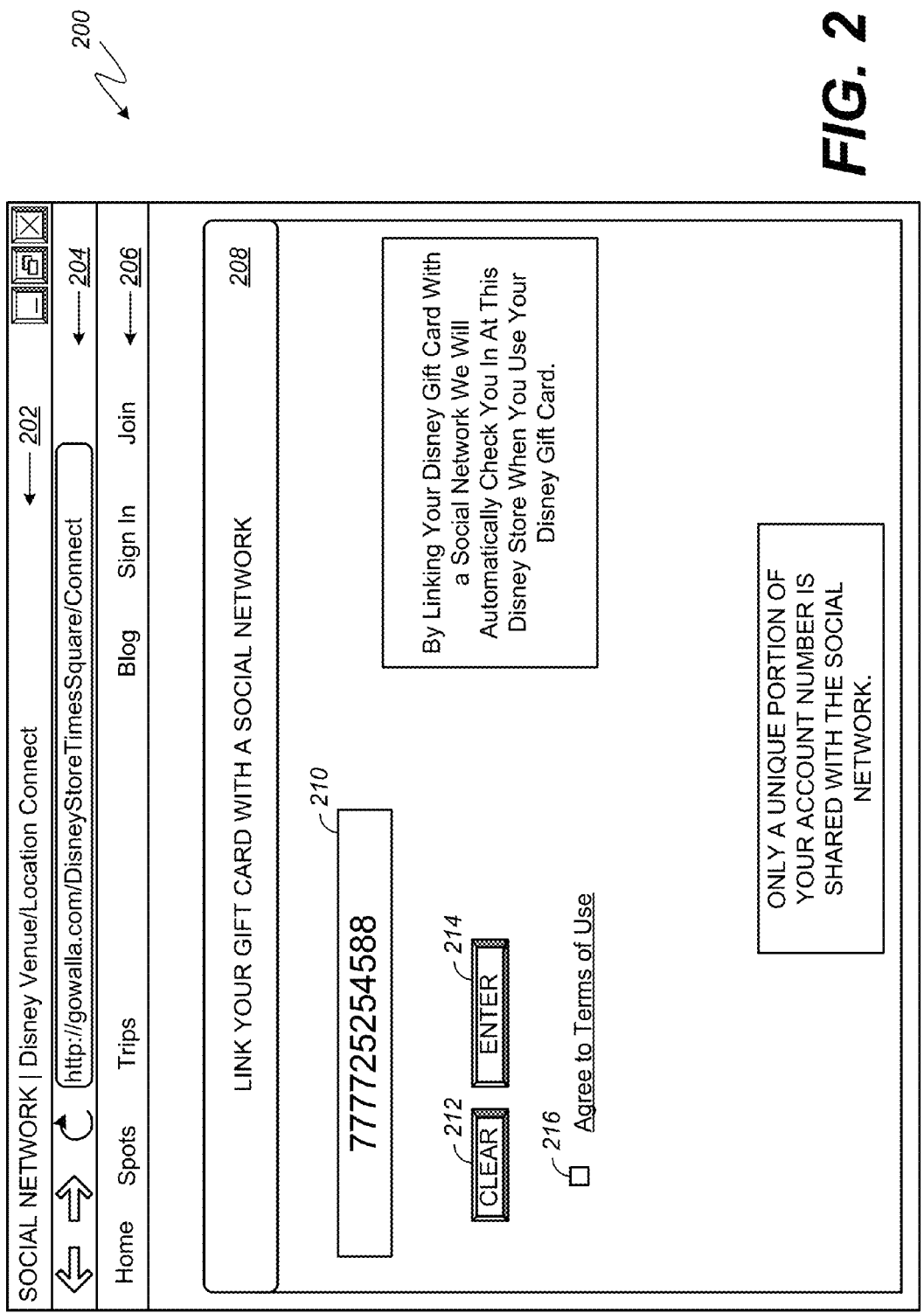
FIG. 2 is a schematic diagram illustrating an embodiment of an interface implemented by the mobile application server of FIG. 1 for receiving user information and entitlement token information.

FIG. 2 is a schematic diagram illustrating an embodiment of an interface implemented by the mobile application server 120 of FIG. 1 for receiving a user indication of intent to participate in a social network application, user identification information and unique entitlement token information. A new user to the location-based service is presented an alternative web page (not shown) for entering user information such as first name, surname, username and password. Otherwise, in a registration or authorization process, the holder of a location-based social network account uses the web browser 185 to select a link to a web page to communicate a unique identifier associated with an entitlement token to the location-based service. By linking the unique identifier from the entitlement token with the user account, the mobile application server 120 can identify or confirm that the account holder is present at the fixed location. Thereafter, the mobile application server 120 generates a message or messages sufficient to cause the social network to implement a behavior as if the user had logged onto to the location-based service and generated a request to check-in at the fixed location. When so configured, the location-based service will broadcast or otherwise communicate information to a social network or messaging service to inform others that the user of the location-based service has checked in at the fixed location.

A link or pushbutton is presented on a web page (not shown) generated by the mobile application server 120 indicating to the holder of the account on the location-based service that they can automate the "check-in" process when they visit an identified Disney venue or location within a venue. In the example illustrated in FIG. 2, the holder of the user account on the location-based service has selected the link or pushbutton indicating their desire to automate the "check-in" process for the Disney Store at Times Square in New York, N.Y., U.S.A. Similar web pages (not shown) may be configured for a user to communicate their desire to automate the "check-in" process at other select Disney locations or venues. The example location-based application web page 200 is published by the mobile application server 120 to the web browser 185 operative on the user's laptop computer 180. The web page 200 includes a title bar 202, first navigation bar 204, second navigation bar 206 and a main panel 208 that indicates to the user that they will be linking their Disney Gift Card with a location-based service. In the illustrated embodiment, the uniform resource locator identified in the first navigation bar 204 indicates that the user will be linking their Disney Gift Card with the location-based service Gowalla®. Gowalla® is a registered trademark of Gowalla, Inc. of Austin, Tex., U.S.A. However, other location-based check-in services such as Foursquare, Whrrl, MyTown, etc., can also be so configured. Foursquare® is a registered trademark of Foursquare Labs, Inc. of New York, N.Y., U.S.A. Whrrl® is a registered trademark of Pelago, Inc., of Seattle, Wash., U.S.A. MyTown is a trademark of Booyah, Inc. of San Francisco, Calif., U.S.A.

The title bar 202 includes the name and location of the fixed location or venue where the holder of the account on the location-based service wishes to automatically check in. The title bar 202 may include additional information. The first navigation bar 204 includes pushbuttons that when selected direct the web browser to, go back one page, go forward one page, and refresh or reload the current page, respectively. In addition, to the pushbuttons, the first navigation menu 204 includes an address entry field that shows the web address or uniform resource locator of the web page 200.

The second navigation bar 206 includes links for navigating or traversing various other web pages within the web site of the location-based service. In the illustrated example, the second navigation bar 206 includes links to a "home" page, a page labeled "Spots" to identify other known locations, a page labeled "Trips" to identify one or more locations that once visited results in a badge or award, a page labeled "Sign In" for members to enter the site, and a page labeled "Join In" for non-members to join the location-based service. The second navigation bar 206 may be configured with more or less links as may be desired. For example, in the example embodiment, the web page 200 also includes a link labeled "Blog" for members of the location-based service to view or post messages about their experiences.

In accordance with the main panel 208, the holder of the user account authorizes the social network (e.g., a location-based service) to link a Disney Gift Card with the location-based service. The main panel 208 includes a data entry field 210 for the user to enter a select portion of the account number from their Disney Gift Card. Preferably, the data entry field 210 is arranged to accept only enough characters to distinguish a unique Disney Gift Card account number and not the entire number. By requiring only a unique portion of the account number to identify the entitlement token (i.e., the Disney Gift Card) there is less risk that an intercepted account number can be misused to purchase goods or services by someone other than a holder of the Disney Gift Card. In the example embodiment, the first twelve digits of a user account number are entered into the data entry field 210. In addition to the data entry field 210 the web page 200 includes pushbutton 212 labeled "Clear," pushbutton 214 labeled "Enter," checkbox 216 and link to review terms of use. The selection of pushbutton 212 removes all information from the data entry field 210. The selection of pushbutton 214 directs the location-based service to store the entered portion of the account number and to link the same with the user's account. By selecting the checkbox 216, the user is acknowledging their agreement with the terms of use and their intent for the location-based service to enable an automated "check-in" operation when the user presents their Disney Gift Card at the Disney Store at Times Square in New York, N.Y., U.S.A. It should be understood that additional web pages may be configured to associate one or more identifiers with one or more other entitlement tokens at other known locations where it is desired for the presentment of the entitlement token to be used as a location identifier by the location-based service. In other words, an entitlement token may be linked with a social network in other ways by leveraging application program interfaces.

FIG. 3 is a schematic diagram illustrating an embodiment of a table 350 that is periodically analyzed or queried by the presentment analyzer 300 operating on the mobile application server 120 of FIG. 1 to identify the presence of the entitlement holder at a fixed location. In the example embodiment, the table 350 includes any number of records consisting of a unique token identifier 352 and a site identifier 354. While date and time entries can be added to the table 350, this information can be maintained or otherwise determined by the presentment analyzer 300 or other software operative on the mobile application server 120. As indicted above, an entitlement token such as token 160 is presented and scanned at location 140 to purchase an item at a Disney Store location. Information received from the token 160, together with transaction information such as the date, time and a unique store identifier, are communicated via one or more communication links over network 110 to the mobile application server 120.

The presentment analyzer 300, operating under the direction of the location-based service, searches the table 350 for records that include a unique token identifier 352 and a site identifier 354 pair. Such pairs, indicated by the values in bold font in the table 350, identify an entitlement token and fixed location linked to each other by the web site 122. When such a pair is identified in the table 350, the location-based service responds by reacting as if the user of the location-based social network account had generated a check-in request from their mobile device while proximally located to the fixed location.

Figure 4:
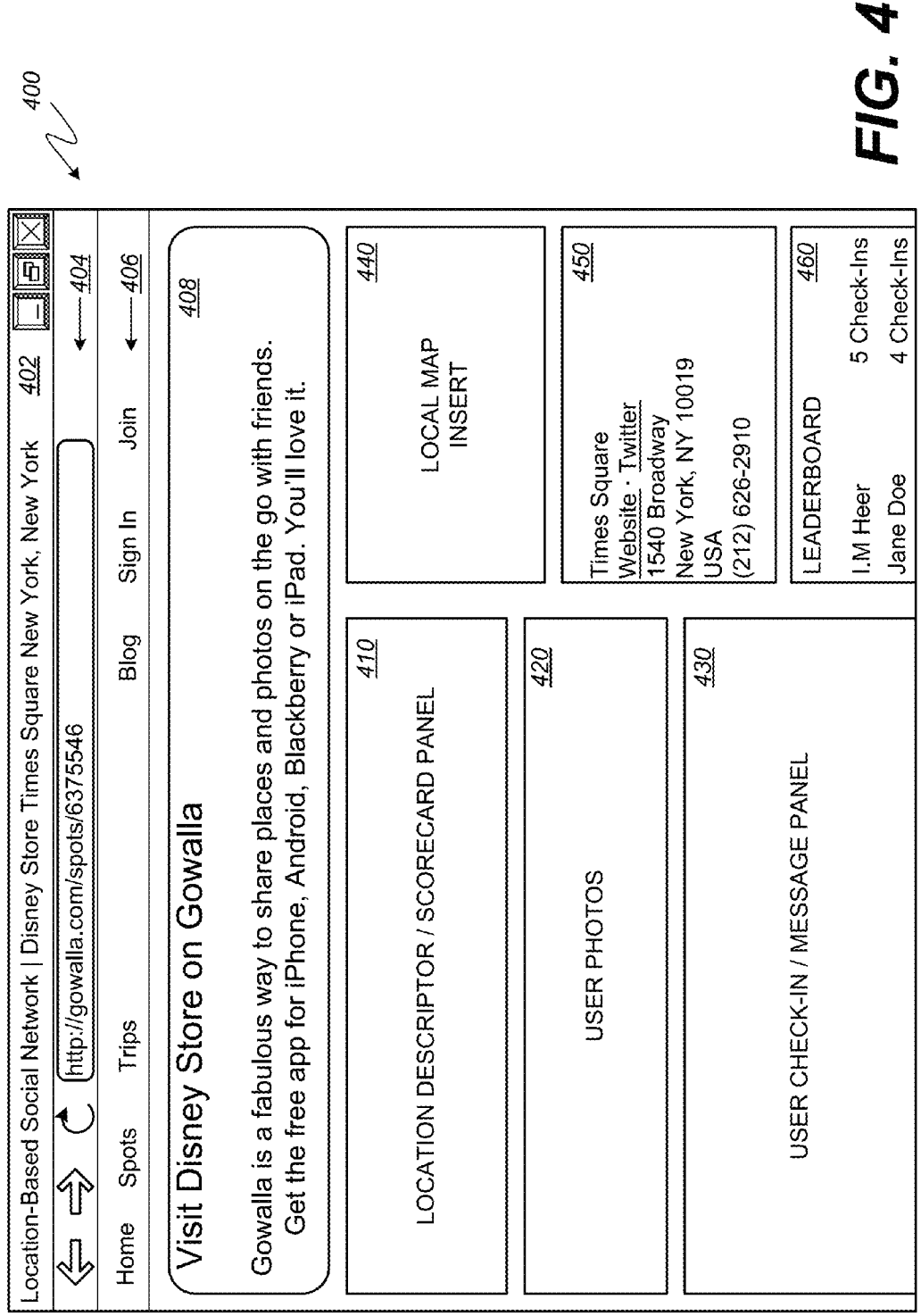
FIG. 4 is a schematic diagram illustrating an embodiment of a web page published by a location-based social network enabled by the mobile application server of FIG. 1.

FIG. 4 is a schematic diagram illustrating an embodiment of a web page 400 published by a location-based social network enabled by the mobile application server 120 of FIG. 1. The example location-based application web page 400 is published by the mobile application server 120 to the web browser 185 operative on the user's laptop computer 180 or any other web browser on a computing device coupled to the network 110. The web page 400 includes a title bar 402, first navigation bar 404, second navigation bar 406 and a body with multiple information inserts or panels. The example web page 400 is published or served by the location-based check-in service Gowalla® and is dedicated to showing those location-based service subscribers that have checked-in at the Disney Store located in Times Square.

The title bar 402 includes the name and location of the fixed location or venue where the holder of the account on the location-based service has checked in. The title bar 402 may include additional information. The first navigation bar 404 includes pushbuttons that when selected, direct the web browser to go back one page, go forward one page, and refresh or reload the current page, respectively. In addition, to the pushbuttons, the first navigation menu 404 includes an address entry field that shows the web address or uniform resource locator of the web page 400. The second navigation bar 406 includes links for navigating or traversing various other web pages within the web site of the Gowalla® location-based check-in service. In the illustrated example, the second navigation bar 406 includes links to a "home" page, a page labeled "Spots" to identify other known locations, a page labeled "Trips" to identify one or more locations that once visited results in a badge or award, a page labeled "Sign In" for members to enter the site, and a page labeled "Join In" for non-members to join the location-based service. The second navigation bar 406 may be configured with more or less links as may be desired. For example, in the example embodiment, the web page 400 also includes a link labeled "Blog" for members of the location-based service to view or post messages about their experiences.

The body of the web page 400 includes an information panel 408 that welcomes observers to the Disney Store on Gowalla® and informs them that applications are available for various mobile devices or mobile device platforms. Information panel 410 includes a description of the location and a running scorecard of the number of check-ins recorded at the location. A user photo panel 420 includes a set of photos that have been shared or uploaded to the site by various visitors to the Disney Store. A user check-in panel 430 includes a personal photo or avatar, a user name and an indication when the user checked in at the location. A local map insert 440 includes a street map of the area immediately surrounding the location to assist visitors to the web page 400 in locating the Disney Store when they visit Times Square. A location information insert 450 includes the name, address and telephone number of the location as well as links to the Disney Store website and to a social network that uses short messaging service messages. A leader board insert 460 includes a list of the users that have checked in the most at the store. An asterisk or other indicator can be added to those visitors that automatically check in when they use a Disney Gift Card or other linked entitlement token as a way of promoting the automatic check-in service.

Figure 5:
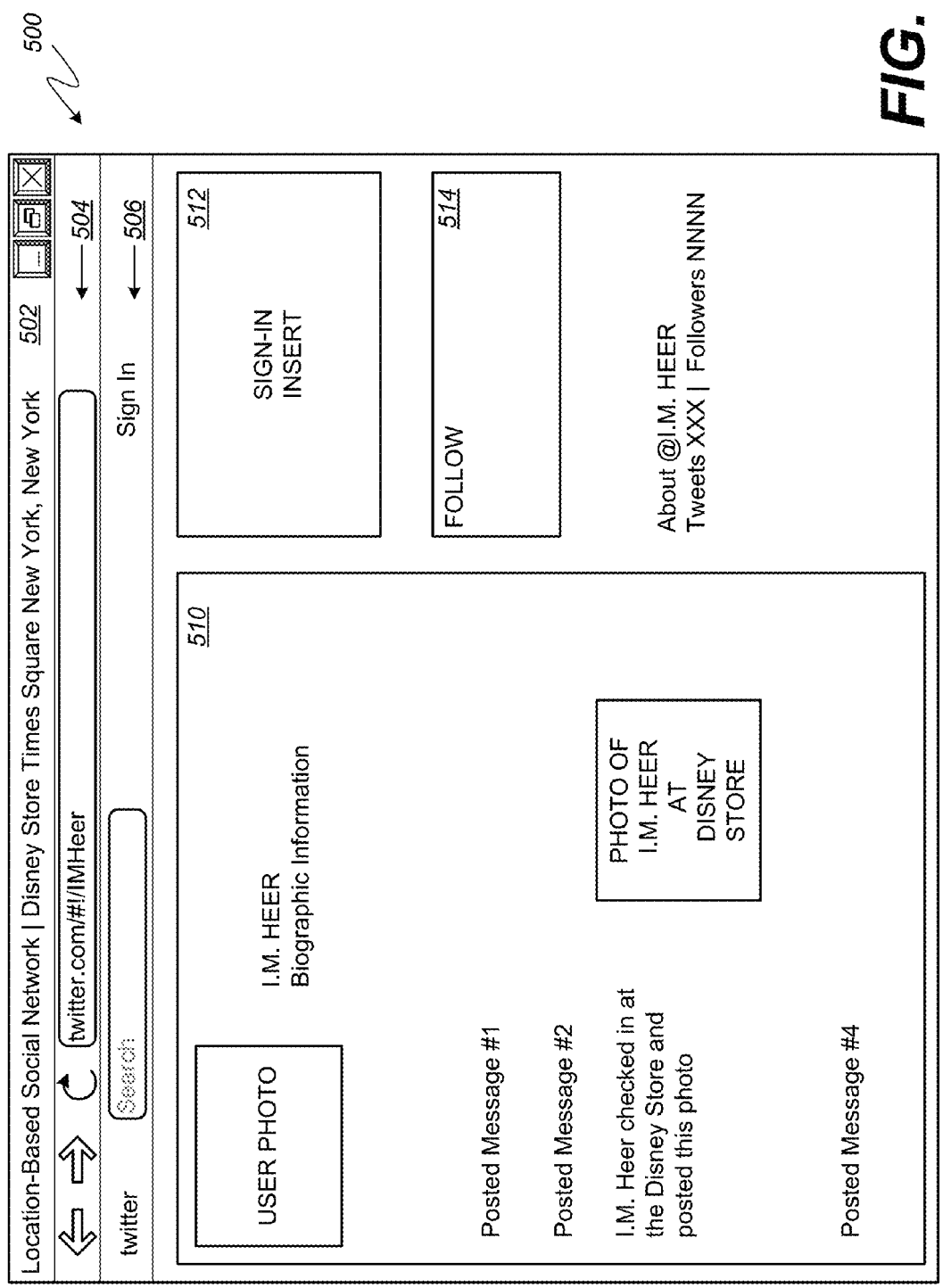
FIG. 5 is a schematic diagram illustrating an embodiment of a web page published by a second social network enabled by the social network server of FIG. 1.

FIG. 5 is a schematic diagram illustrating an embodiment of a web page 500 published by a second social network enabled by the social network server 130 of FIG. 1. The example web page 500 is published by the social network server 130 to the web browser 185 operative on the user's laptop computer 180 or any other web browser on a computing device coupled to the network 110. The web page 500 is arranged with a title bar 502, first navigation bar 504, second navigation bar 506 and a body with multiple information inserts or panels. The example web page 500 is published or served by the social network Twitter®, which permits others interested in following messages posted by the featured individual at the site. Twitter® is a registered trademark of Twitter, Inc. of San Francisco, Calif., U.S.A. The body includes a first information panel 510 that includes information about the featured individual as well as their most recent messages. The body also includes a sign-up panel 512 with a link 514 that enables a visitor to the web page 500 to authorize the social network to link or forward the messages of the featured individual to the "follower." When the location-based service is so configured, the location-based service will generate a message via Twitter's published application program interface (API) as if it was produced by the user of the social network account from a browser on their mobile device when the automatic check-in has been posted.

For example, if I.M. Heer has linked their Disney Gift Card to authorize an automatic check-in via Gowalla® when they use the Disney Gift Card at the Disney Store in Times Square, upon receipt of transaction information indicating that I.M. Heer has used the Disney Gift Card at the Disney Store in Times Square, the location-based service will add a check-in entry for I.M. Heer. If I.M. Heer has communicated a preference to inform followers on another social network when she has checked in at the Disney Store in Times Square, the location-based service will generate an appropriate message by generating an API call to Twitter to announce or otherwise share the "check-in" with the social network. The social network, in turn, posts the message as if it was written by I.M. Heer using a browser on her mobile device.

Figure 6:
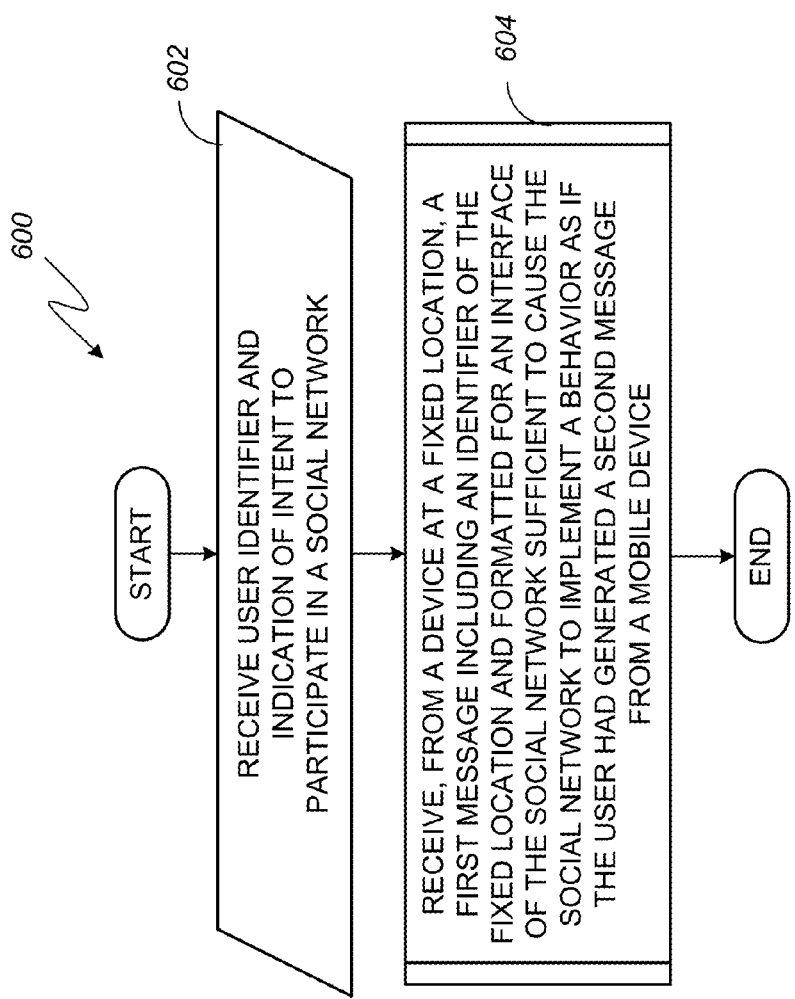
FIG. 6 is a flow diagram illustrating the operation of an embodiment of a method for enabling participation in a social network.

FIG. 6 is a flow diagram illustrating the operation of an embodiment of a method 600 for enabling participation in a social network. The method 600 begins in block 602 where a location-based service enabled on a mobile application server 120 receives a user identifier and an indication of the user's intent to participate in a social network. In the example embodiment, the user is an account holder with the location-based check-in service Gowalla®. As described above, Gowalla® is an online location-based social networking game where users share their experiences as they travel to particular points of interest.

Thereafter, as indicated in block 604, the location-based service receives, from a device at a fixed location, a first message including an identifier of the fixed location and formatted for an interface of the social network sufficient to cause the social network to implement a behavior as if the user had generated a second message from a mobile device. In an embodiment, the first message includes transaction information read or otherwise retrieved from a POS device or scanner at a retail store such as the Disney Store in Times Square, New York, N.Y. The transaction information includes a unique site identifier and unique information encoded on an entitlement token that the user previously shared with the location-based social network service. The location-based social network service analyzes transaction information from one or more Disney Store locations and when it is determined that the entitlement token was presented by the user at the Disney Store in Times Square, as identified by the unique site identifier in the first message, the location-based social network service automatically adds a check-in entry on the web page associated with the Disney Store in Times Square on behalf of the user. The result of the automated check-in entry appears no different to observers of the web page published by the location-based social network service than check-in messages received from the user or other users that check-in using conventional methods via browsers enabled on mobile devices.

Figure 7:
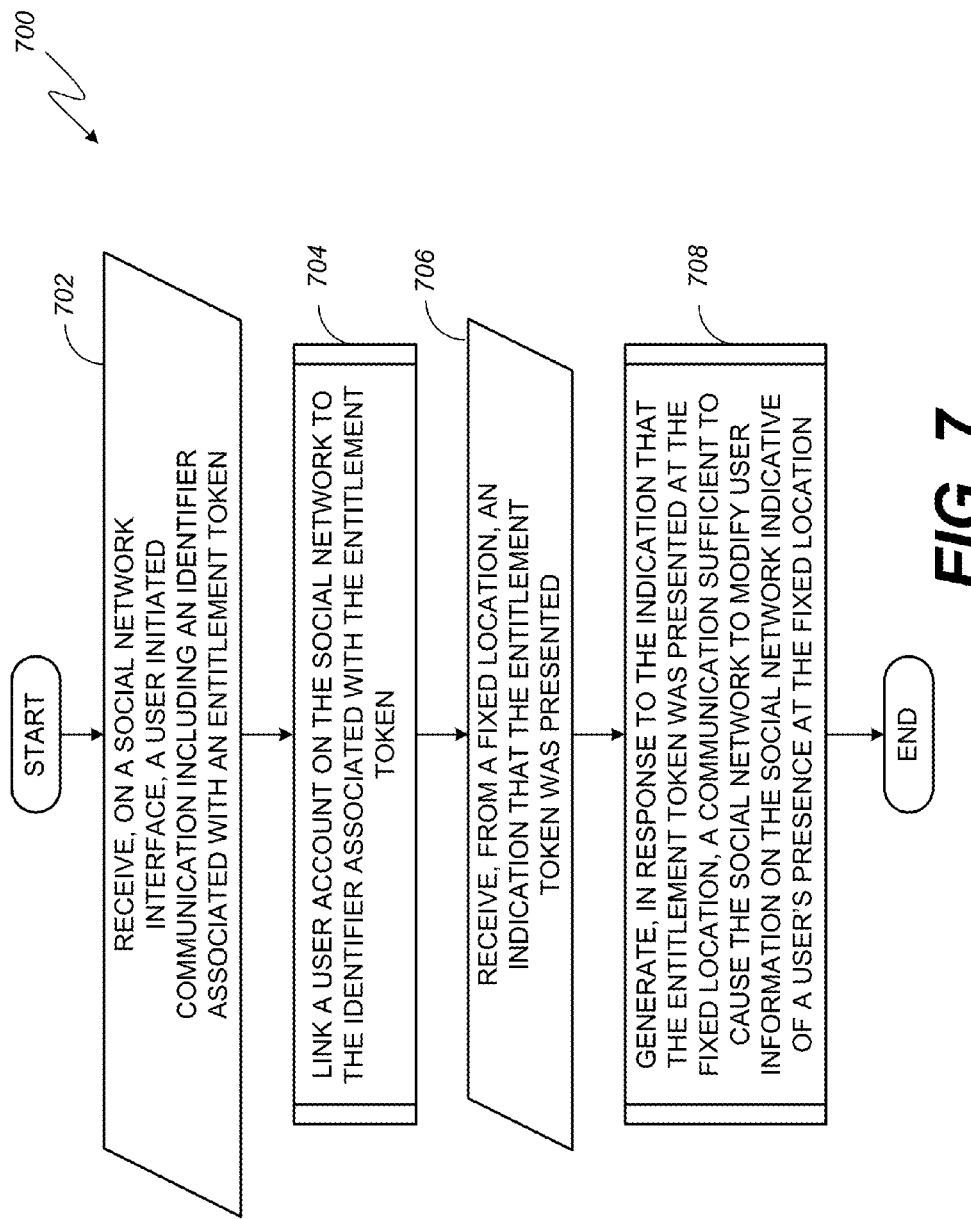
FIG. 7 is a flow diagram illustrating the operation of an alternative embodiment of a method for enabling participation in a social network.

FIG. 7 is a flow diagram illustrating the operation of an alternative embodiment of a method for enabling participation in a social network. The method 700 begins with block 702 where a location-based service enabled on a mobile application server 120 receives, on a social network interface, a user initiated communication including an identifier associated with an entitlement token. In the example embodiment, the user initiated communication is enabled via a web page arranged to receive a unique portion of a Disney Gift Card account number. The web page, such as the example web page 200, indicates to the user that use of the entitlement token at a particular Disney Store will result in an automatic check-in by the user on the location-based social network. In block 704, the location-based service links a user account on the social network to the identifier associated with the entitlement token received from the user in block 702.

Thereafter, as indicated in block 706, the location-based service receives, from a fixed location, an indication that the entitlement token was presented. In an embodiment, the indication that the entitlement token was presented is in the form of transaction information received from one or more Disney Store locations. The transaction information includes an account number associated with the entitlement token and an identifier of the fixed location. Next, in block 708, the location-based social network service generates, in response to the indication that the entitlement token was presented at the fixed location, a communication sufficient to cause the social network to modify user information on the social network indicative of a user's presence at the fixed location. As indicated above, the location-based social network service automatically adds a check-in entry on the web page associated with the Disney Store in Times Square on behalf of the user. The result of the automated check-in entry appears no different to observers of the web page published by the location-based social network service than check-in messages received from the user or other users that check-in using conventional methods via browsers enabled on mobile devices. When the user has indicated via preferences or otherwise that they wish to share their check-in with other social networks, the location-based service generates and communicates an appropriate message for updating the user's status on one or more other social networks. These other social networks can include Twitter®, Facebook®, or others. Facebook® is a registered trademark of Facebook, Inc. of Palo Alto, Calif., U.S.A.

While various embodiments of the invention have been described, it will be apparent to those of ordinary skill in the art that many more embodiments and implementations are possible that are within the scope of the systems and methods for enabling participation in a social network as defined in the following claims.

What is claimed is:

1. A computer-implemented method for enabling participation in a social network, the method being implemented in a computer system that includes one or more physical processors, the method comprising:

defining content to be presented through a social network webpage associated with a fixed location;

receiving user identification information that identifies a user and includes (i) an identifier associated with an entitlement token, and (ii) an indication the user intends to participate in a location-based service;

receiving, via transmission effectuated by a device at the fixed location, a first message indicating the entitlement token has been presented at the device, wherein the transmission includes an identifier associated with the fixed location; and responsive to reception of the first message, updating the social network webpage associated with the fixed location to reflect a visit by the user to the fixed location, wherein updating the social network webpage associated with the fixed location to reflect a visit by the user to the fixed location is responsive to intermittent analysis of an information table, and wherein the intermittent analysis of the information table confirms presentment of a user's entitlement token to establish a presumed presence of the user at the fixed location.

2. The method of claim 1, wherein the step of receiving user identification information and the indication is communicated via a website.

3. The method of claim 1, wherein the user identification information is associated with an entitlement token.

4. The method of claim 3, wherein the entitlement token is selected from the group consisting of a printed ticket, a gift card, a resort benefit card, and an encoded image.

5. The method of claim 1, wherein updating the social network webpage associated with the fixed location to reflect a visit by the user to the fixed location comprises updating the social network webpage as if the user had sent the first message from the mobile device.

6. The method of claim 1, wherein receiving user identification information comprises using a magnetic stripe scanner.

7. The method of claim 1, wherein receiving user identification information comprises using an optical scanner.

8. The method of claim 1, wherein receiving user identification information comprises using a radio-frequency scanner.

9. A computer-implemented method for enabling participation in a location-based social network application, the method being implemented in a computer system that includes one or more physical processors, the method comprising:
- hosting, as part of the social network, a social network webpage associated with a fixed location;
- receiving, on a social network interface, a user initiated communication including an identifier associated with an entitlement token;
- linking a user account on the social network to the identifier associated with the entitlement token;
- receiving a transmission indicating the entitlement token was presented at a device associated with the fixed location; and
- in response to the indication that the entitlement token was presented at the fixed location, updating the social network webpage associated with the fixed location to reflect a visit by the user to the fixed location,
- wherein the updating the social network webpage associated with the fixed location to reflect a visit by the user to the fixed location is responsive to intermittent analysis of an information table, and
- wherein the intermittent analysis of the information table confirms presentment of a user's entitlement token to establish a presumed presence of the user at the fixed location.

10. The method of claim 9, wherein the step of receiving, on a social network application interface, a user initiated communication further comprises receiving a portion of a gift card account number.

11. The method of claim 9, wherein the step of receiving, on a social network application interface, further comprises receiving a portion of a resort card account number.

12. The method of claim 9, wherein the transmission includes information obtained in a scan of the entitlement token.

13. A system for monitoring and presenting human activity, comprising:
- a server coupled to a network and operable under program control to provide a location-based service to a social network that includes a social network webpage associated with a fixed location, the server including:
- a user interface that prompts a user of the social network to communicate an identifier associated with an entitlement token, the server linking the identifier with user account information on the social network; and
- a processor configured to receive a transmission including the identifier associated with the entitlement token that indicates the entitlement token was presented at a device associated with the fixed location, and in response to the transmission, generate a message that directs the social network to update the social network webpage associated with the fixed location to reflect a visit by the user, wherein generation of the message that directs the social network to update the social network webpage associated with the fixed location to reflect a visit by the user to the fixed location is responsive to intermittent analysis of an information table, and wherein the intermittent analysis of the information table confirms presentment of a user's entitlement token to establish a presumed presence of the user at the fixed location.

14. The system of claim 13, wherein the user interface receives an identifier associated with an entitlement token that can be scanned upon presentment.

15. The system of claim 13, wherein the identifier associated with an entitlement token includes a unique portion of an account number.

* * * * *